United States Patent [19]
Hasushita et al.

[11] Patent Number: 5,663,838
[45] Date of Patent: Sep. 2, 1997

[54] ZOOM LENS SYSTEM

[75] Inventors: Sachio Hasushita; Takayuki Ito, both of Tokyo, Japan

[73] Assignee: Asahi Kogaku Kogyo Kabushiki Kaisha, Tokyo, Japan

[21] Appl. No.: 523,935

[22] Filed: Sep. 6, 1995

[30] Foreign Application Priority Data

Sep. 7, 1994 [JP] Japan ................. 6-213462

[51] Int. Cl.$^6$ ............... G02B 15/14; G02B 13/18
[52] U.S. Cl. .................... 359/692; 359/689; 359/714
[58] Field of Search ....................... 359/692, 689, 359/714

[56] References Cited

U.S. PATENT DOCUMENTS

| | | | |
|---|---|---|---|
| 5,162,947 | 11/1992 | Ito | 359/692 |
| 5,260,833 | 11/1993 | Ito et al. | 359/689 |
| 5,272,564 | 12/1993 | Suzuki et al. | 359/686 |
| 5,278,699 | 1/1994 | Ito et al. | 359/692 |
| 5,309,285 | 5/1994 | Ito | 359/692 |
| 5,386,321 | 1/1995 | Kawamura | 359/692 |
| 5,424,871 | 6/1995 | Ito et al. | 359/689 |
| 5,434,712 | 7/1995 | Ito | 359/692 |
| 5,493,448 | 2/1996 | Betensky et al. | 359/692 |

FOREIGN PATENT DOCUMENTS 6-130298  5/1994  Japan .

OTHER PUBLICATIONS

Hecht, Eugene, Hecht Optics, Second Edition 1987 p. 235.

*Primary Examiner*—Scott J. Sugarman
*Attorney, Agent, or Firm*—Greenblum & Bernstein P.L.C.

[57] ABSTRACT

A zoom lens system which includes a positive first lens group and a negative second lens group, arranged in this order from an object side so that a distance between the first and second lens groups is changed to alter the focal length. The first lens group includes a first negative sub-lens group, and a first positive sub-lens group. The first negative sub-lens group includes a first negative lens made of glass, and a second negative lens made of plastic. The first positive sub-lens group includes a positive third lens made of glass. The negative second lens group includes a positive fourth lens made of plastic, and a negative fifth lens made of glass lens, in this order from the object side. The zoom lens system satisfies the following relationships:

$$SF1=(r_{1-1}+r_{1-2})/(r_{1-1}-r_{1-2})\leq 0;$$

and $$SF2=(r_{2-1}+r_{2-2})/(r_{2-1}-r_{2-2})>0$$

where SF1 designates the shaping factor of the first negative lens, SF2 the shaping factor of the second negative lens, and $r_{i-j}$ the radius of curvature of the j-th surface of the i-th lens, respectively.

13 Claims, 13 Drawing Sheets

| SPHERICAL ABERRATION SINE CONDITION | SPHERICAL ABERRATION CHROMATIC ABERRATION | ASTIGMATISM | DISTORTION |

ZOOM LENS SYSTEM

BACKGROUND OF THE INVENTION

1. Field of the Invention

The present invention relates to an inexpensive zoom lens system which can be advantageously used in a compact camera where restrictions on the back focal distance are less restrictive than in a single lens reflex camera.

2. Description of Related Art

A known compact camera having a zoom lens consisting of two lens groups and having a zoom ratio approximately equal to 2, is comprised of either a relatively large number of lenses (6 to 9 lenses) or a relatively small number of aspherical lenses (4 lenses at the most). In the former type, where a large number of lenses are used, it is difficult to reduce the production cost. While in the latter type where a relatively small number of lenses are used, the relationship between the number, and the arrangement of aspherical lenses which are used is still uncertain and in the process of being improved. The applicability of plastic lenses used in conjunction with the aspherical lenses has also been studied. In addition, the production cost of the latter type of zoom lens is not satisfactory. A two-lens group type of zoom lens is also known. This lens group is made of two or three lenses, however the F-number thereof at the telephoto extremity exceeds 10.

SUMMARY OF THE INVENTION

Therefore, the objects of the present invention are to provide a compact camera having an improved zoom lens whose F-number at the telephoto extremity is approximately F8 or F9, where plastic lenses and aspherical lenses are effectively employed, the production cost is reduced, a high optical performance can be obtained, and changes in temperature or humidity have less influence over the plastic lenses.

To achieve the objects mentioned above, according to the present invention, there is provided a zoom lens system having two lens groups including five lenses in total. These two lens groups comprise a first positive lens group and a second negative lens group, arranged in this order from the object side so that the distance between the first and second lens groups is changed to alter the focal length.

The first lens group is comprised of a first negative sub-lens group, and a first positive sub-lens group. The first negative sub-lens group is comprised of a negative first lens, which is made of glass; and a negative second lens, which is made of plastic. The first positive sub-lens group is comprised of a positive third lens, which is made of glass.

The second negative lens group is comprised of a positive fourth lens, which is made of plastic, and a negative fifth lens, which is made of glass, in this order from the object side.

The above described zoom lens system meets the requirements defined by the following relationships (1) and (2):

$$SF1=(r_{1-1}+r_{1-2})/(r_{1-1}-r_{1-2}) \leq 0 \quad (1)$$

$$SF2=(r_{2-1}+r_{2-2})/(r_{2-1}-r_{2-2}) > 0 \quad (2)$$

where

SF1 defines a shaping factor of the negative first lens;
SF2 defines a shaping factor of the negative second lens;
$r_{i-j}$ defines a radius of curvature of the j-th surface of the i-th lens.

Preferably, the negative plastic second lens is made of a negative meniscus lens whose convex in paraxial shape faces the object side and which is provided with a diverging aspherical surface that satisfies the following relationship (3) below:

$$\Delta X_{L2-1} > 0 \quad (3)$$

where $\Delta X_{L2-1}$ represents an amount of aspherical deviation of the surface of the second lens on the object side at the maximum effective diameter thereof.

In a preferred embodiment, the positive plastic fourth lens is made of a positive meniscus lens with a concave paraxial shape which faces the object side and which is provided with a converging aspherical surface that satisfies the following relationship (4) below:

$$0 < \Delta X_{L4-1} \quad (4)$$

where $\Delta X_{L4-1}$ represents an amount of aspherical deviation of the surface of the fourth lens on the object side at the maximum effective diameter thereof.

A zoom lens system according to the present invention preferably meets the requirement defined by the relationship (5) below:

$$0 < \Delta P_{L2} + \Delta P_{L4} < 0.6 \quad (5)$$

where $\Delta P_{L2} = f_{L2} \cdot (m_{L3-L5} - m_{L2-L5})^2 / 100;$ $\Delta P_{L2}$ represents a variation (mm) in focus when the focal length of the second lens changes by +1% at the telephoto extremity;

$f_{L2}$ represent a focal length of the plastic second lens;

$m_{L3-L5}$ : lateral magnification of the third through fifth lenses at the telephoto extremity;

$m_{L2-L5}$ represents a lateral magnification of the second through fifth lenses at the telephoto extremity;

and where $\Delta P_{L4} = f_{L4} \cdot (m_{L5-L5})^2 / 100$ $\Delta P_{L4}$ represents a variation (mm) in focus when the focal length of the fourth lens changes by +1% at the telephoto extremity;

$f_{L4}$ represents a focal length of the plastic fourth lens;

$m_{L5}$ represents a lateral magnification of the fifth lens at the telephoto extremity; and $m_{L4-L5}$: lateral magnification of the fourth and fifth lenses at the telephoto extremity.

Preferably, a zoom lens system according to the present invention meets the requirements defined by the relationships (6) and (7) below:

$$-0.7 < \Delta P_{L2} < -0.1 \quad (6)$$

$$0.3 < \Delta P_{L4} < 1.0 \quad (7)$$

According to another aspect of the present invention, there is provided a zoom lens system including a positive first lens group and a negative second lens group, arranged in this order from the object side so that the distance between the first and second lens groups is changed to alter the variable power.

The first lens group is comprised of a first negative sub-lens group and a first positive sub-lens group. The first negative sub-lens group is comprised of a negative first lens and a negative second lens. The first positive sub-lens is group comprised of a positive third lens. The zoom lens system meets the requirements defined by the following relationships (1), (2), (8), (9) and (10):

$$SF1=(r_{1-1}+r_{1-2})/(r_{1-1}-r_{1-2}) \leq 0 \qquad (1)$$

$$SF2=(r_{2-1}+r_{2-2})/(r_{2-1}-r_{2-2}) > 0 \qquad (2)$$

$$1.3 < f_W/f_{1G} < 1.7 \qquad (8)$$

$$-0.9 < f_{1G}/f_{L1-L2} < -0.4 \qquad (9)$$

$$0.3 < f_{L1-L2}/f_{L1} < 1.0 \qquad (10)$$

where fw represents a focal length of the overall system at the wide angle extremity;

$f_{1G}$ represents a focal length of the first lens group;

$f_{L1-L2}$ represents a focal length of the first negative sub-lens group;

$f_{L1}$ represents a focal length of the negative first lens of the first negative first group;

SF1 represents a shaping factor of the negative first lens;

SF2 represents a shaping factor of the negative second lens; and $r_{i-j}$ represents a radius of curvature of the j-th surface of the i-th lens.

In this zoom lens system, preferably, the negative first and second lenses of the positive first lens group are made of a glass lens and a plastic lens, respectively. The third lens is made of a glass lens. Moreover, the negative second plastic lens is provided with at least one diverging aspherical surface. The negative second lens group can be comprised of two lens groups having two lenses, i.e., a positive plastic fourth lens and a negative glass fifth lens.

The present disclosure relates to subject matter contained in Japanese Patent Application No.06-213462 (filed on Sep. 7, 1994) which is expressly incorporated herein by reference in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 1:
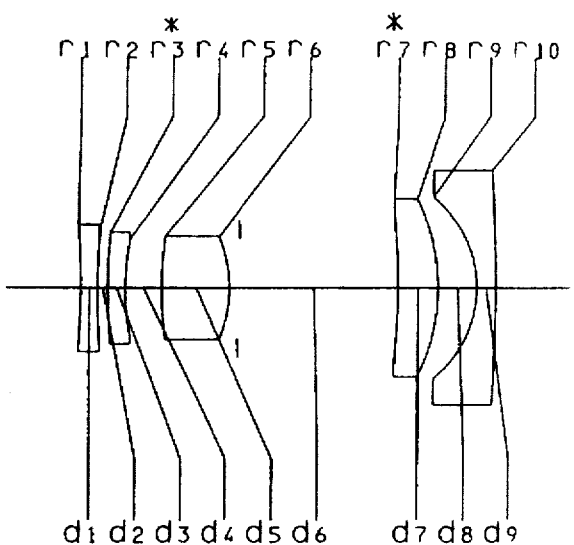
FIG. 1 is a schematic view showing a lens arrangement of a zoom lens system, according to a first embodiment of the present invention.

According to the present invention, in a zoom lens system which is comprised of a small number of lenses, plastic lenses are effectively employed to reduce the production cost. Namely, in a zoom lens system of the present invention, two plastic lenses are used, one for a negative lens belonging to a positive first lens group, and one for a positive lens belonging to a negative second lens group. The two plastic lenses have a (positive or negative) power whose sign is opposite to that of the power of the lens group to which the respective plastic lens belongs, and hence, the power of the plastic lens can be attenuated. Because of the combination of the different signs of power, the plastic lenses are little influenced by changes in temperature or humidity, and the production cost can be reduced. Since a plastic lens can be more easily cracked or damaged than a glass lens, the first lens and the last lens are made of glass, rather than plastic whose durability is less than that of glass. To this end, plastic lenses are used for the negative second lens of the positive first lens group from the object side, and for the second lens of the negative second lens group from the image side, i.e. the fourth lens from the object side.

In the zoom lens system according to the present invention, since, the first lens group is positive and the second lens group is negative. The miniaturization of the zoom lens system tends to increase the positive distortion. To compensate for this distortion, according to the present invention, a retrofocus type lens system is used having a first negative sub-lens group 1n (first and second lenses) and a first positive sub-lens group 1p (third lens). Using a first lens group of retrofocus type prevents the back focal distance from being too small.

If the back focal distance is too small, the diameter of the second lens group increases.

Since the zoom lens system, of the present invention, is miniaturized by decreasing the number of lenses to be incorporated, positive distortion tends to increase. Additionally, spherical aberration can not be completely corrected. To prevent this, the zoom lens system of the present invention is designed to meet the requirements defined by relationship (1), i.e., the shaping factor SF1 of the negative first lens is equal to or less than zero (SF1≦0) and the shaping factor SF2 of the negative second lens is greater than zero (SF2>0). If SF1≦0, the curvature of the first concave surface of the negative first lens increases and thus, positive distortion can be reduced. If SF2>0, the curvature of the second concave surface of the negative second lens increases, and thus, the spherical aberration and the comatic aberration can be corrected. Namely, if SF1>0, it is difficult to correct the positive distortion, and if Sf2≦0, it is difficult to correct the spherical aberration and the comatic aberration.

If the sub-lens group 1n is comprised of two negative lenses, i.e., a negative first lens made of glass and a negative second lens made of plastic, the negative power of the plastic lens can be reduced. Moreover, nothing can directly come into contact with the negative second lens (plastic lens) after the zoom lens system is assembled, and so there is no possibility that the plastic lens can be cracked or damaged. The same would be true for the second lens group which is comprised of a positive plastic fourth lens and a negative glass fifth lens, in this order from the object side.

In general, since the shape or refractive index of a plastic lens changes considerably, due to changes in temperature or humidity in comparison with a glass lens. It is preferable that the power of the plastic lens is low to restrict the change in focus and ensure a desired optical performance, even even with changes in temperature or humidity.

If the first positive lens group is comprised of a small number of lenses, the spherical aberration, in particular, cannot be satisfactorily compensated, and accordingly, it is preferable that the first positive lens group is provided with at least one diverging aspherical surface. Note that the term "diverging" refers to a convex surface whose positive power gradually decreases toward the peripheral edge thereof, or a concave surface whose negative power gradually increases toward the peripheral edge. If the sub-lens group 1n is provided with a diverging aspherical surface, positive distortion can be effectively compensated.

The present invention also endeavors to reduce the production cost of a zoom lens system. A plastic lens, even if it has an aspherical surface, can be inexpensively produced, and hence, the aspherical surface is preferably provided on the negative plastic second lens rather than the negative glass first lens. In connection with this, the negative plastic second lens is preferably made of a negative meniscus lens having a convex surface that faces the object side, i.e., $0<R_{L2-I}$. Note that $R_{Li-I}$ designates the radius of curvature of the surface of the i-th lens on the object side, and $R_{Li-II}$ designates the radius of curvature of the surface of the i-th lens on the image side. The diverging aspherical surface can be provided on the convex surface adjacent to the object side and not on the opposite concave surface (i.e., $\Delta X_{L2-I}<0$), to minimize a possible influence on the aberration due to a manufacturing error or an inclination of the aspherical surface (see relationship (3)). Preferably, the first surface of the first lens is made of a concave surface that faces the object side to correct the positive distortion ($R_{Li-I}<0$).

If the second negative lens group is made of a small number of lenses, an over-correction of the spherical aberration, astigmatism and distortion tends to occur within the second negative lens group. To this end, the second negative lens group is preferably provided with a converging aspherical surface contrary to the first positive lens group which is provided with a diverging aspherical surface. The term "converging" refers to a convex surface having a positive power which gradually increases toward the peripheral edge thereof, or a concave surface having a negative power which gradually decreases toward the peripheral edge.

To reduce the production cost, the plastic lens is preferably used as the positive fourth lens. Additionally, the plastic is not the last lens from the object side. In connection with this, the fourth lens has a concentric shape in which the concave surface faces the diaphragm to effectively compensate for the aberrations due to astigmatism. Moreover, it is preferable that the concave surface ($R_{L4-I}<0$) on the object side is provided with a converging aspherical surface ($0<\Delta X_{L4-I}$) to minimize production error influences on the aspherical surface (see formula (4)).

Figure 25:
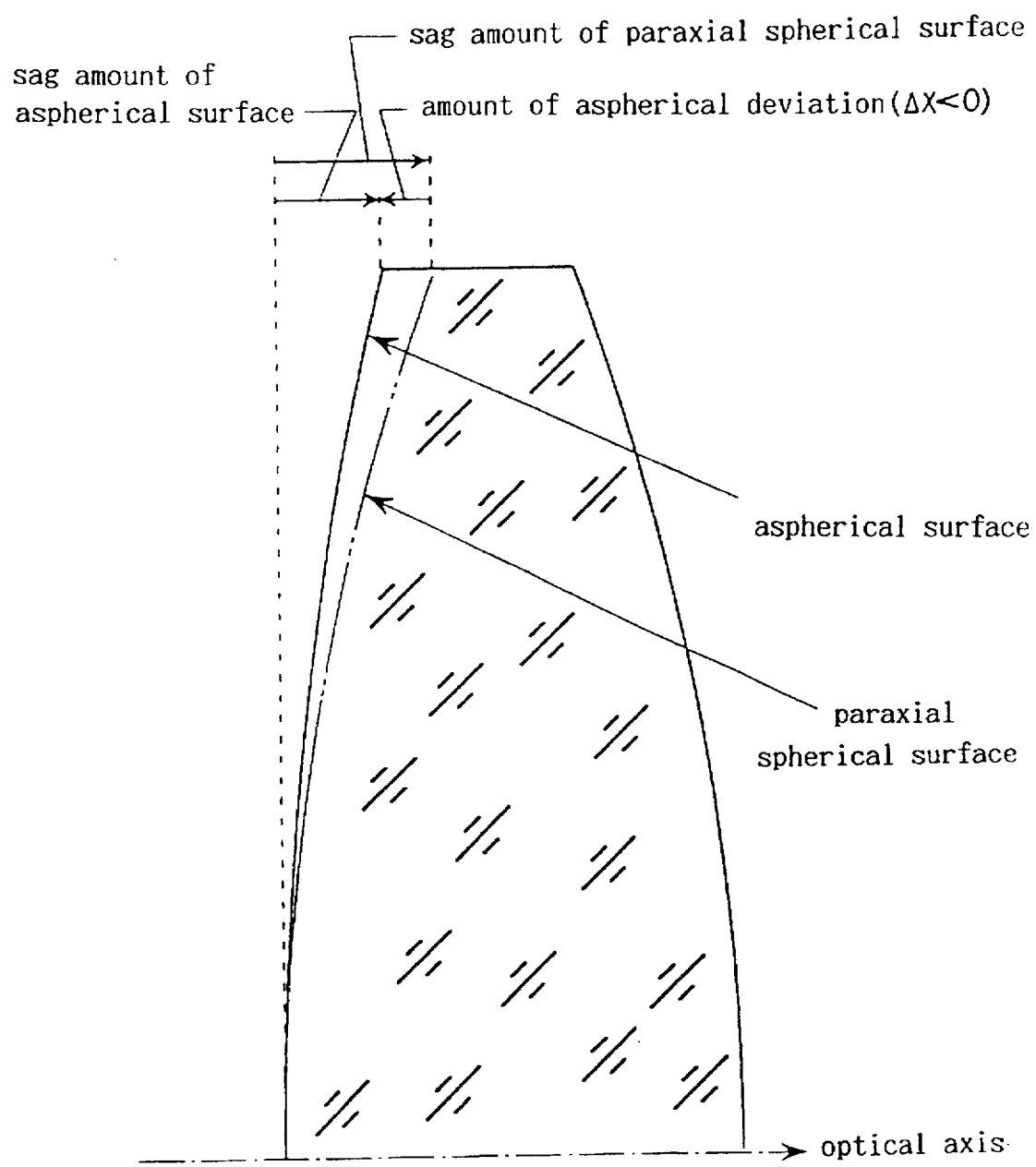

FIG. 25 shows a definition of the amount of aspherical deviation. The aspherical surface is formed by adding an aspherical surface on top of a paraxial spherical surface (spherical base surface). The amount of aspherical deviation is defined by the sag amount of a paraxial spherical surface minus the sag amount of an aspherical surface, as can be seen in FIG. 25. Note that the sag amount corresponds to the distance between the tangential plane of the lens perpendicular to the optical axis and the lens surface.

The expression "diverging aspherical surface" refers to an aspherical surface which provides a divergence to surface refracting power of the spherical base surface. The expression "converging aspherical surface" refers to an aspherical surface which provides a convergence to the surface refracting power of the spherical base surface.

The relationships (5), (6) and (7) specify the change in focus of the plastic lenses due to changes in temperature and humidity. In general, the focal length of a plastic lens changes by about +1% for a temperature change of about +30° C. Consequently, the change in focus at the telephoto extremity by the negative plastic second lens when there is a change in temperature of +30° C. is a negative value represented by:

$$\Delta P_{L2} = f_{L2}(m_{L3-LS} - m_{L2-LS})^2/100, \text{ where } f_{L2}<0$$

Similarly, the change in focus by the positive plastic fourth lens is a positive value represented by:

$$\Delta P_{L4} = f_{L4}(m_{L5} - m_{L4-LS})^2/100, \text{ where } f_{L4}<0$$

If the temperature changes in the positive direction, there is a change in focus in the negative direction, due to the presence of a lens frame. Therefore, the value of $\Delta P_{L2}+\Delta P_{L4}$ is preferably positive, as can be seen in relationship (5). If the value of $\Delta P_{L2}+\Delta P_{L4}$ is above the upper limit of relationship (5), the positive power of the positive plastic lens is so large that there is an undesirably large focus change due to the temperature and humidity.

The relationships (6) and (7) specify the change in focus for the negative and positive plastic lenses. In general, it is preferable for a plastic lens not to have a large power. However, if the value of $\Delta P_{L2}$ or $\Delta P_{L4}$ is above the upper limit or below the lower limit of the relationships (6) or (7), the power is too small to correct, for example, chromatic aberration, and the spherical aberration, for the associated lens group. Conversely, if the value of $\Delta P_{L2}$ or $\Delta P_{L4}$ is above the upper limit or below the limit in the relationships (6) or (7), the change in the power, due to a change in the shape of the plastic lenses or a change in temperature, is increased, thus resulting in a deterioration of the optical performance of the zoom lens.

The relationships (8), (9) and (10) are related to the power distribution of the lenses. The relationship (8) specifies the power of the first lens group. If the value of the ratio in relationship (8) is above the upper limit, which contributes to a miniaturization of a zoom lens system, the power is too large to correct the aberrations within the first lens group, particularly in a zoom lens system in which the number of lenses is reduced. If the ratio is below the lower limit in relationship (8), the displacement of the lenses is increased and hence, the overall length of the lens system is increased.

The relationship (9) relates to the power of the negative sub-lens group in of the first lens group and specifies the resultant focal length of the two negative lenses. If the value of the ratio in relationship (9) is above the upper limit, the negative power is too small to correct the aberrations within the first lens group. If the ratio is below the lower limit in relationship (9), not only the negative power of the negative sub-lens group 1n, but also the positive power of the positive sub-lens group 1p are so large that high-order aberrations are produced.

The relationship (10) relates to the power distribution of the two negative lenses (glass lens and plastic lens) belonging to the negative sub-lens group 1n. If the value of the ratio in relationship (10) is below the lower limit, the negative power of the negative plastic second lens is so large that the aberration of the plastic lens is influenced considerably by changes in temperature and humidity. The lower limit is preferably more than 0.5, since it is preferable that the power of the glass lens is larger than the power of the plastic lens, so the plastic lens has less influence. If the ratio is above the upper limit in relationship (10), the second plastic lens has a positive power, and accordingly, it is difficult to correct the aberrations by the single negative glass lens. Moreover, the change in focus of the positive plastic lens belonging to the second lens group can be restricted.

Several numerical examples (embodiments) of a zoom lens system according to the present invention will now be discussed below.

FIGS. 1, 5, 9, 13, 17 and 21 show lens arrangements according to the first, second, third, fourth, fifth, and sixth embodiments of the present invention, respectively. In these embodiments, the zoom lens system is comprised of two lens groups including five lenses in total, i.e., a negative glass first lens, a negative plastic second lens, a positive glass third lens, a positive plastic fourth lens, and a negative glass fifth lens, in this order from the object side.

Figure 2:
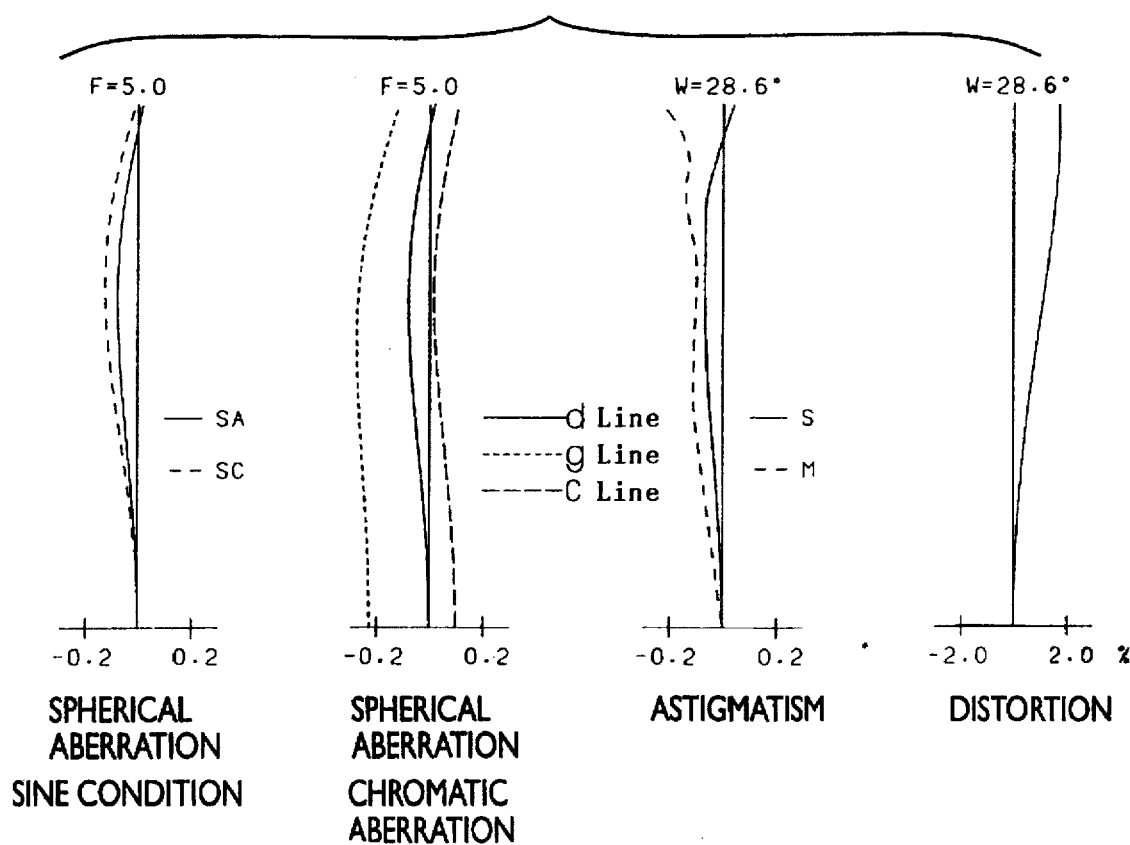
FIG. 2 shows diagrams of various aberrations of the zoom lens system shown in FIG. 1, at a wide angle extremity.
Figure 3:
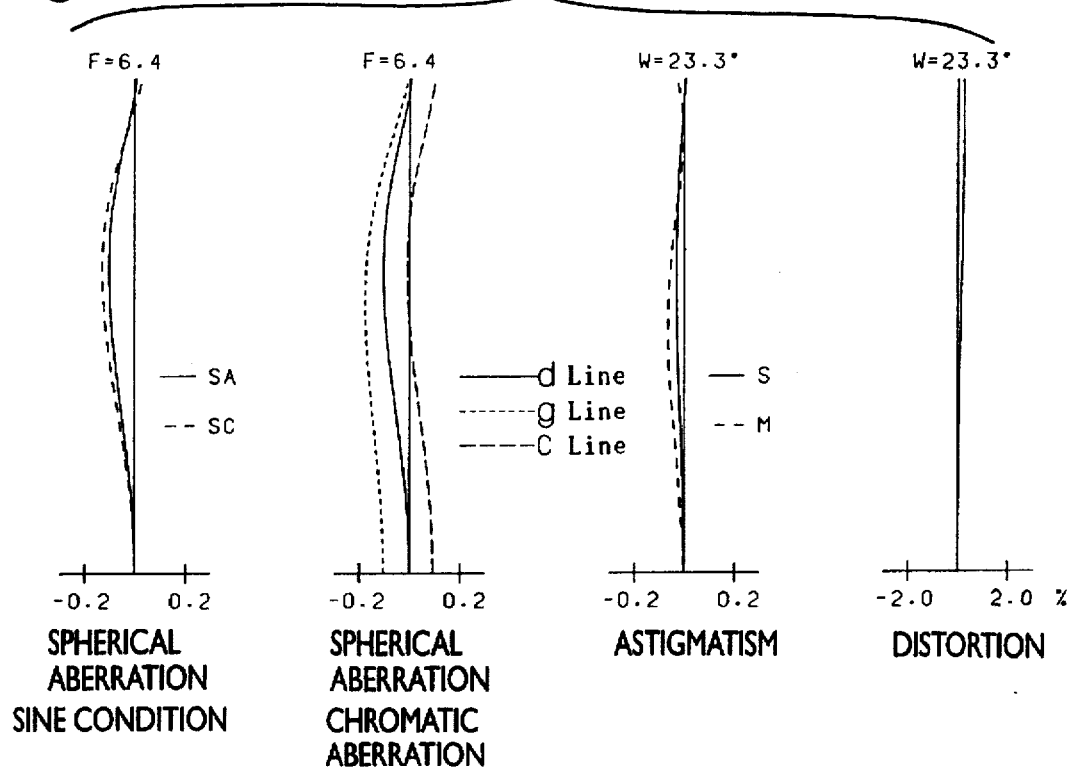
FIG. 3 shows diagrams of various aberrations of the zoom lens system shown in FIG. 1, at an intermediate focal length.
Figure 4:
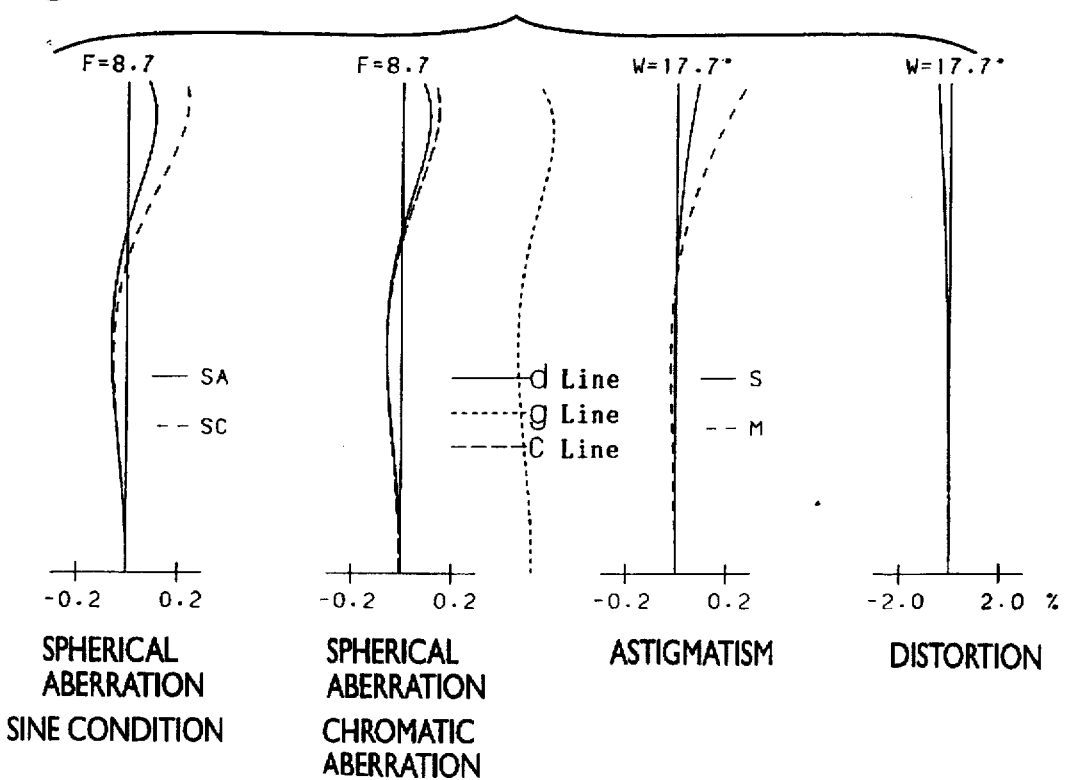
FIG. 4 shows diagrams of various aberrations of the zoom lens system shown in FIG. 1, at a telephoto extremity.

Embodiment 1:

Numerical data of the zoom lens system according to the first embodiment is shown in Table 1 below. The aberrations thereof at the wide angle extremity, an intermediate focal length and the telephoto extremity are shown in FIGS. 2, 3 and 4, respectively.

In the drawings, "SA" designates the spherical aberration; "SC" the sine condition; "d-line", "g-line" and "C-line" the chromatic aberrations represented by the spherical aberrations at the respective wavelengths; and "S" and "M" the sagittal ray and meridional ray, respectively. Furthermore, in the tables and the drawings, "$F_{NO}$" designates the f-number; "f" the focal length; "W" the half angle of view; "$f_B$" the back focal distance; "R" the radius of curvature; "d" the distance between the lenses; "$N_d$" the refractive index of the d-line; and "$v_d$" the Abbe number of the d-line.

TABLE 1

$F_{NO}$ = 1:5.0–6.4–8.7
f = 39.0–50.0–68.0
W = 28.6–23.3–17.7
$f_B$ = 13.62–26.20–46.72
d6 = 14.64–9.85–5.37

The stop (diaphragm) is located 0.9 mm behind the second surface of the third lens.

| Surface No. | R | d | $N_d$ | $v_d$ |
|---|---|---|---|---|
| 1 | −74.114 | 1.49 | 1.62004 | 36.3 |
| 2 | 74.114 | 0.83 | — | — |
| 3* | 33.790 | 1.59 | 1.58547 | 29.9 |
| 4 | 23.944 | 3.16 | — | — |
| 5 | 36.069 | 5.98 | 1.48749 | 70.2 |
| 6 | −12.034 | $d_6$ | — | — |
| 7* | −50.676 | 3.49 | 1.58547 | 29.9 |
| 8 | −18.613 | 3.36 | — | — |
| 9 | −10.575 | 1.69 | 1.62588 | 35.7 |
| 10 | −167.473 | — | — | — |

*marked surface is aspherical.
NO. 3: K = 0.0, A4 = −0.14549 × $10^{-3}$, A6 = −0.13584 × $10^{-5}$, A8 = 0.0, A10 = 0.0
NO. 7: K = 0.0, A4 = 0.45059 × $10^{-4}$, A6 = 0.14838 × $10^{-6}$, A8 = 0.29408 × $10^{-8}$, A10 = 0.0

The shape of an aspheric surface can be generally expressed as follows:

$$x=Ch^2/\{1+[1-(1+K)C^2h^2]^{1/2}\}+A4h^4+A6h^6+A8h^8+A10h^{10}+\ldots$$

where

"h" represents a height above the axis;

"x" represents a distance from a tangent plane of an aspherical vertex;

"C" represents a curvature of the aspherical vertex(1/r);

"K" represents a conic constant;

"A4" represents a fourth-order aspherical factor;

"A6" represents a sixth-order aspherical factor;

"A8" represents an eighth-order aspherical factor; and

"A10" represents a tenth-order aspherical factor.

Data corresponding to relationships 1 to 10, for the first embodiment, is given below:

SF1=0.00

SF2=5.86

$\Delta X_{L2-f}$=−0.112 (when h=5.0)

$\Delta X_{L4-f}$=0.1984 (when h=7.5)

$\Delta P_{L2}+\Delta P_{L4}$=0.27

($\Delta P_{L2}$=−0.36, $\Delta P_{L4}$=0.63)

Figure 5:
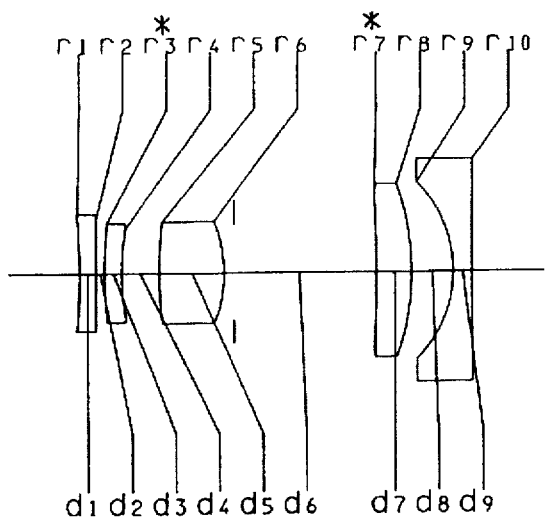
FIG. 5 is a schematic view showing a lens arrangement of a zoom lens system, according to a second embodiment of the present invention.
Figure 6:
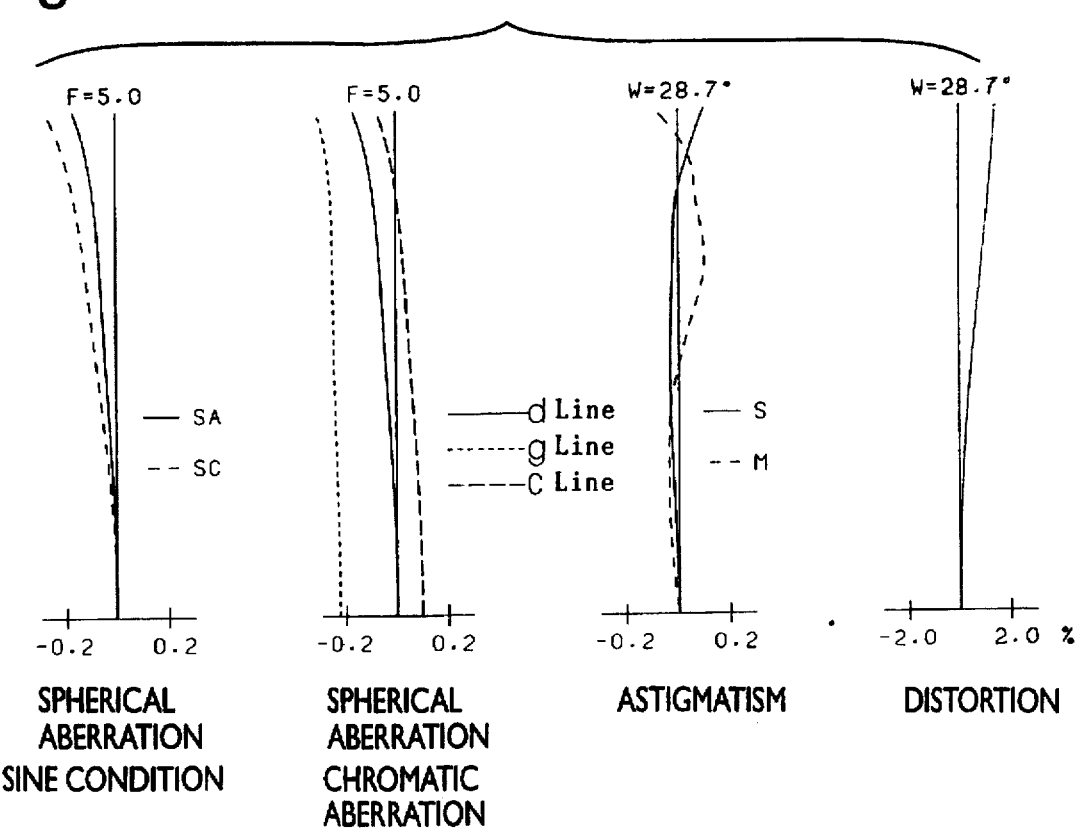
FIG. 6 shows diagrams of various aberrations of the zoom lens system shown in FIG. 5, at a wide angle extremity.
Figure 7:
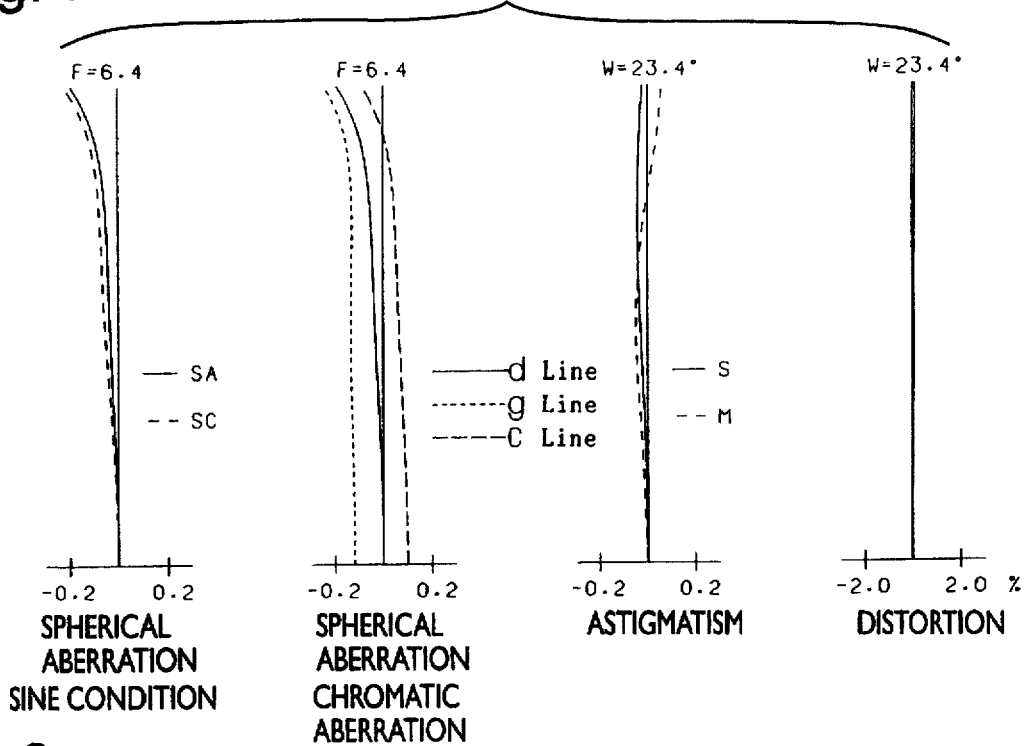
FIG. 7 shows diagrams of various aberrations of the zoom lens system shown in FIG. 5, at an intermediate focal length.
Figure 8:
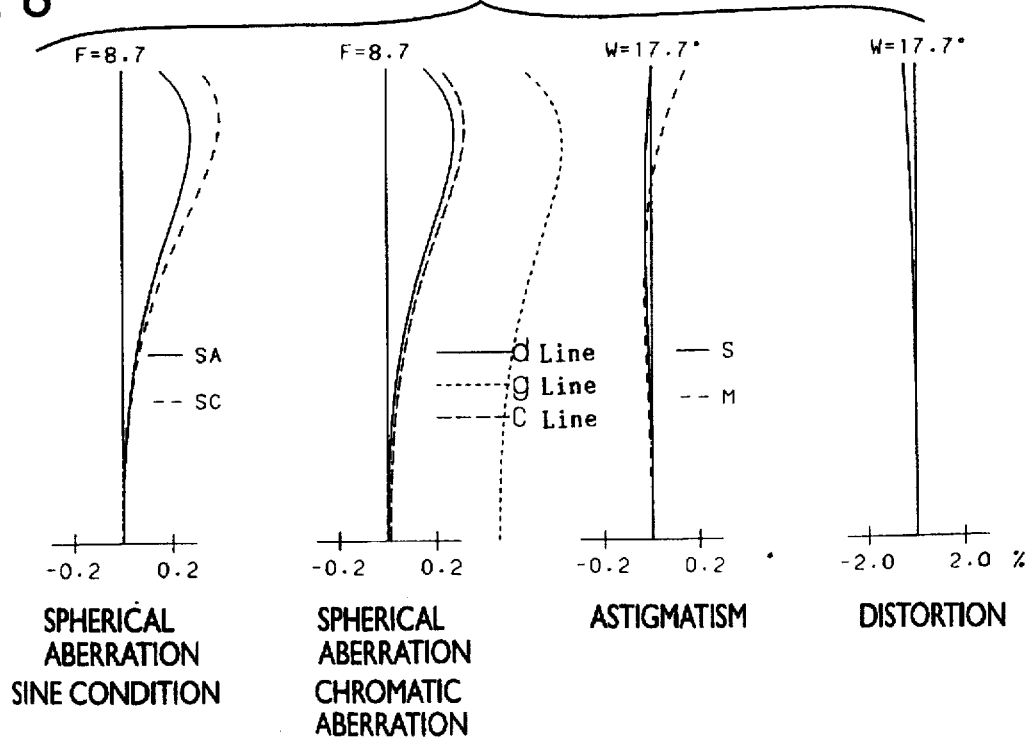
FIG. 8 shows diagrams of various aberrations of the zoom lens system shown in FIG. 1, at a telephoto extremity.

$f_{L2}$=−1.493, $m_{L3-L5}$=−1.636, $m_{L2-L5}=-1.142$ $\therefore \Delta P_{L2}=-0.36$ $f_{L4}=48.3$, $m_{L5}=3.641$, $m_{L4-L5}=2.496$ $\therefore \Delta P_{L4}=0.63$ $f_W/f_{1G}=1.43, f_{1G}/f_{L1-L2}=-0.66$ $f_{L1-L2}/f_{L1}=0.70$ Embodiment 2:

Numerical data of the zoom lens system of the second embodiment is shown in Table 2 below. The lens arrangement in the second embodiment is shown in FIG. 5. Aberrations at the wide angle extremity, an intermediate focal length, and the telephoto extremity are shown in FIGS. 6, 7 and 8, respectively.

TABLE 2

$F_{NO} = 1:5.0-6.4-8.7$
$f = 39.0-50.0-68.0$
$W = 28.7-23.3-17.7$
$f_B = 14.33-27.03-47.81$
$d_6 = 13.77-8.88-4.29$

The stop (diaphragm) is located 0.9 mm behind the second surface of the third lens.

| Surface No. | R | d | $N_d$ | $v_d$ |
|---|---|---|---|---|
| 1 | −63.572 | 1.49 | 1.74950 | 35.3 |
| 2 | 200.610 | 0.79 | — | — |
| 3* | 34.116 | 1.59 | 1.58547 | 29.9 |
| 4 | 22.828 | 3.39 | — | — |
| 5 | 37.067 | 5.98 | 1.48749 | 70.2 |
| 6 | −12.051 | $d_6$ | — | — |
| 7* | −99.292 | 3.19 | 1.58547 | 29.9 |
| 8 | −23.207 | 3.79 | — | — |
| 9 | −11.510 | 1.69 | 1.62004 | 36.3 |
| 10 | 837.198 | — | — | — |

*marked surface is aspherical.
NO. 3: $K = 0.0, A4 = -0.14899 \times 10^{-3}, A6 = -0.10903 \times 10^{-5}, A8 = 0.0, A10 = 0.0$
NO. 7: $K = 0.0, A4 = 0.37025 \times 10^{-4}, A6 = 0.41668 \times 10^{-7}, A8 = 0.19195 \times 10^{-8}, A10 = 0.0$ Data corresponding to relationships 1 to 10, for the second embodiment, is given below:

$SF1=-0.52$ $SF2=5.04$ $\Delta X_{L2-F}=-0.0702$ (when h=4.5)

$\Delta X_{L4-F}=0.1438$ (when h=7.5)

Figure 9:
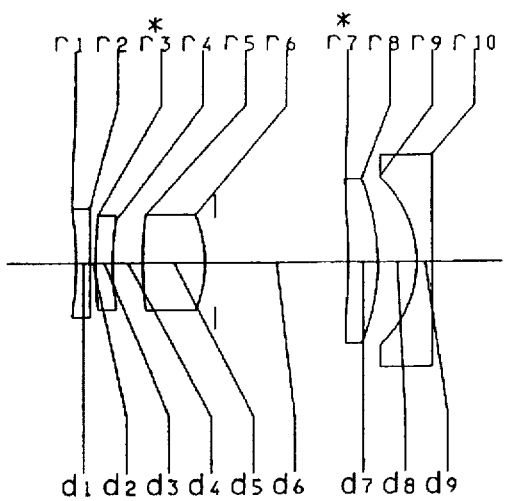
FIG. 9 is a schematic view showing a lens arrangement of a zoom lens system, according to a third embodiment of the present invention.
Figure 10:
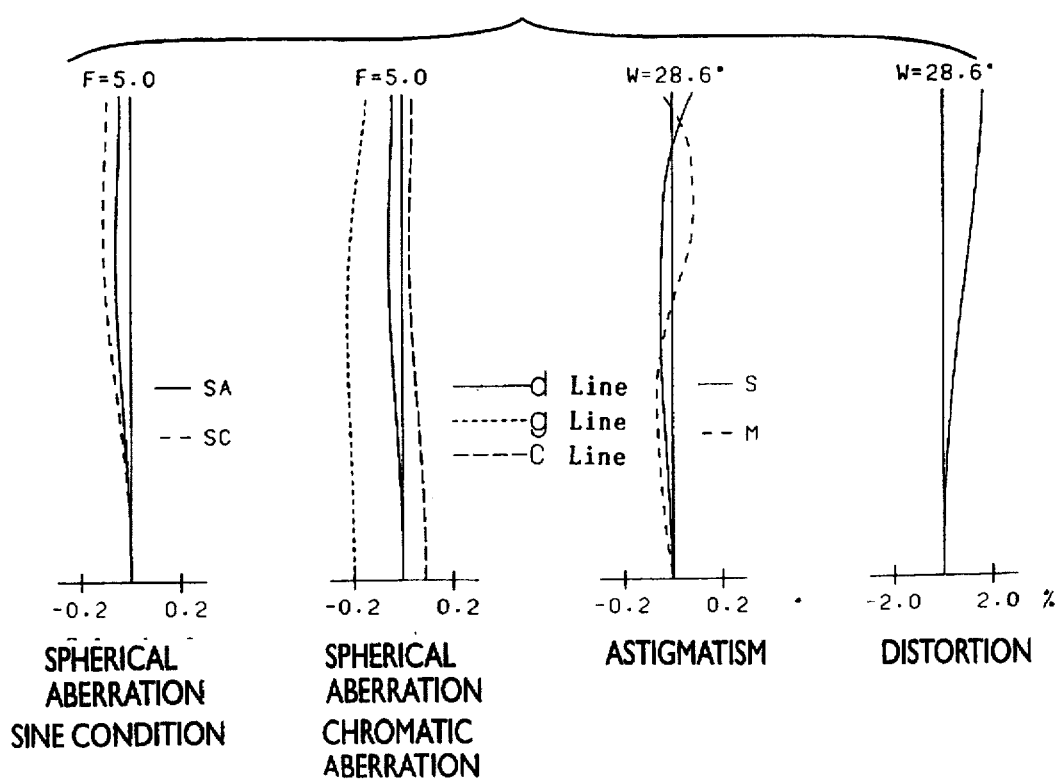
FIG. 10 shows diagrams of various aberrations of the zoom lens system shown in FIG. 9, at a wide angle extremity.
Figure 11:
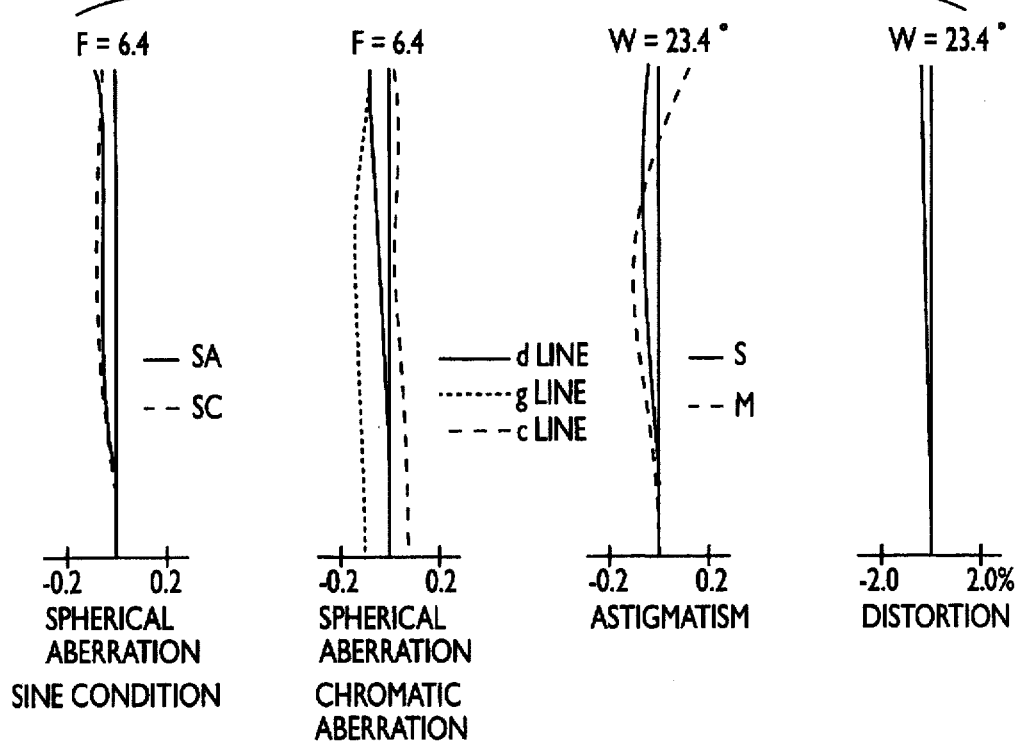
FIG. 11 shows diagrams of various aberrations of the zoom lens system shown in FIG. 9, at an intermediate focal length.
Figure 12:
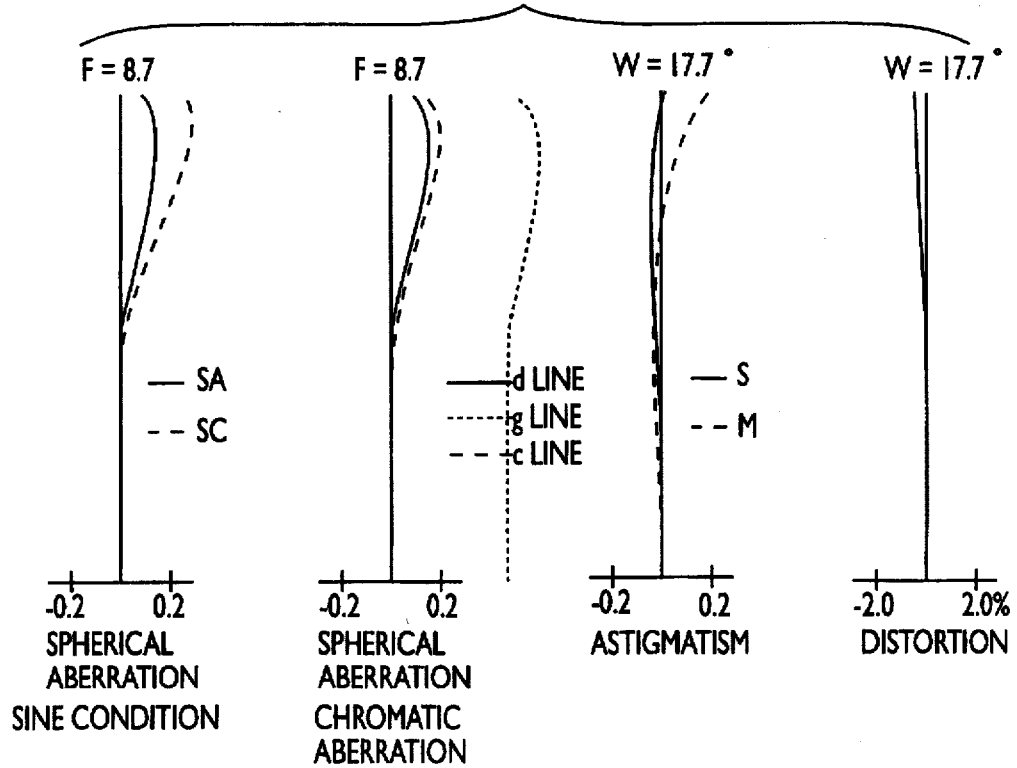
FIG. 12 shows diagrams of various aberrations of the zoom lens system shown in FIG. 9, at a telephoto extremity.

$\Delta P_{L2}+\Delta P_{L4}=0.29$ $(\Delta P_{L2}=-0.43, \Delta P_{L4}=0.72)$ $f_{L2}=-124.3$, $m_{L3-L5}=-1.645$, $m_{L2-L5}=-1.058$ $\therefore \Delta P_{L2}=-0.43$ $f_{L4}=50.94$, $m_{L5}=3.669$, $m_{L4-L5}=2.480$ $\therefore \Delta P_{L4}=0.72$ $f_W/f_{1G}=1.42, f_{1G}/f_{L1-L2}=-0.66$, $f_{L1-L2}/f_{L1}=0.64$ Embodiment 3:

FIG. 9 shows a lens arrangement of a zoom lens system according to a third embodiment. Numerical data of the zoom lens system of the third embodiment is shown in Table 3 below. Aberrations at the wide angle extremity, an intermediate focal length, and the telephoto extremity are shown in FIGS. 10, 11 and 12, respectively.

TABLE 3

$F_{NO} = 1:5.0-6.4-8.7$
$f = 39.0-50.0-68.0$
$W = 28.6-23.4-17.7$
$f_B = 14.48-27.23-48.08$
$d_6 = 13.63-8.77-4.21$

The stop (diaphragm) is located 0.9 mm behind the second surface of the third lens.

| Surface No. | R | d | $N_d$ | $v_d$ |
|---|---|---|---|---|
| 1 | −36.320 | 1.39 | 1.64769 | 33.8 |
| 2 | −813.580 | 0.50 | — | — |
| 3* | 36.868 | 1.59 | 1.58547 | 29.9 |
| 4 | 26.024 | 2.73 | — | — |
| 5 | 34.746 | 5.98 | 1.48749 | 70.2 |
| 6 | −12.118 | $d_6$ | — | — |
| 7* | −67.637 | 2.89 | 1.58547 | 29.9 |
| 8 | −20.526 | 3.63 | — | — |
| 9 | −11.010 | 1.49 | 1.61293 | 37.0 |
| 10 | −1239.189 | — | — | — |

*marked surface is aspherical.
NO. 3: $K = 0.0, A4 = -0.14465 \times 10^{-3}, A6 = -0.11097 \times 10^{-5}, A8 = 0.0, A10 = 0.0$
NO. 7: $K = 0.0, A4 = 0.40857 \times 10^{-4}, A6 = 0.65157 \times 10^{-7}, A8 = 0.23830 \times 10^{-8}, A10 = 0.0$ Data corresponding to relationships 1 to 10, for the third embodiment, is given below:

$SF1=-1.09$ $SF2=5.80$ $\Delta X_{L2-F}=-0.00685$ (when h=4.5)

$\Delta X_{L4-F}=0.1647$ (when h=7.5)

Figure 13:
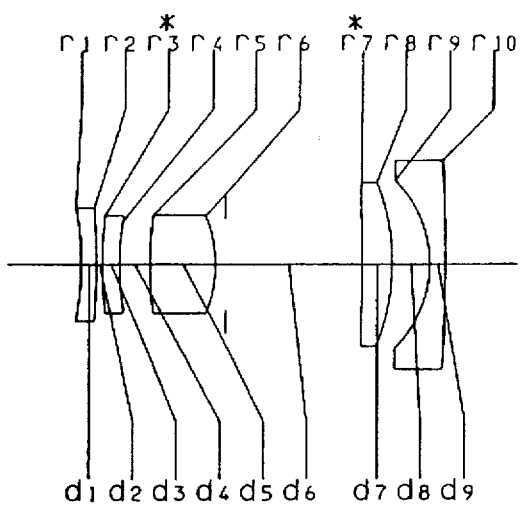
FIG. 13 is a schematic view showing a lens arrangement of a zoom lens system, according to a fourth embodiment of the present invention.
Figure 14:
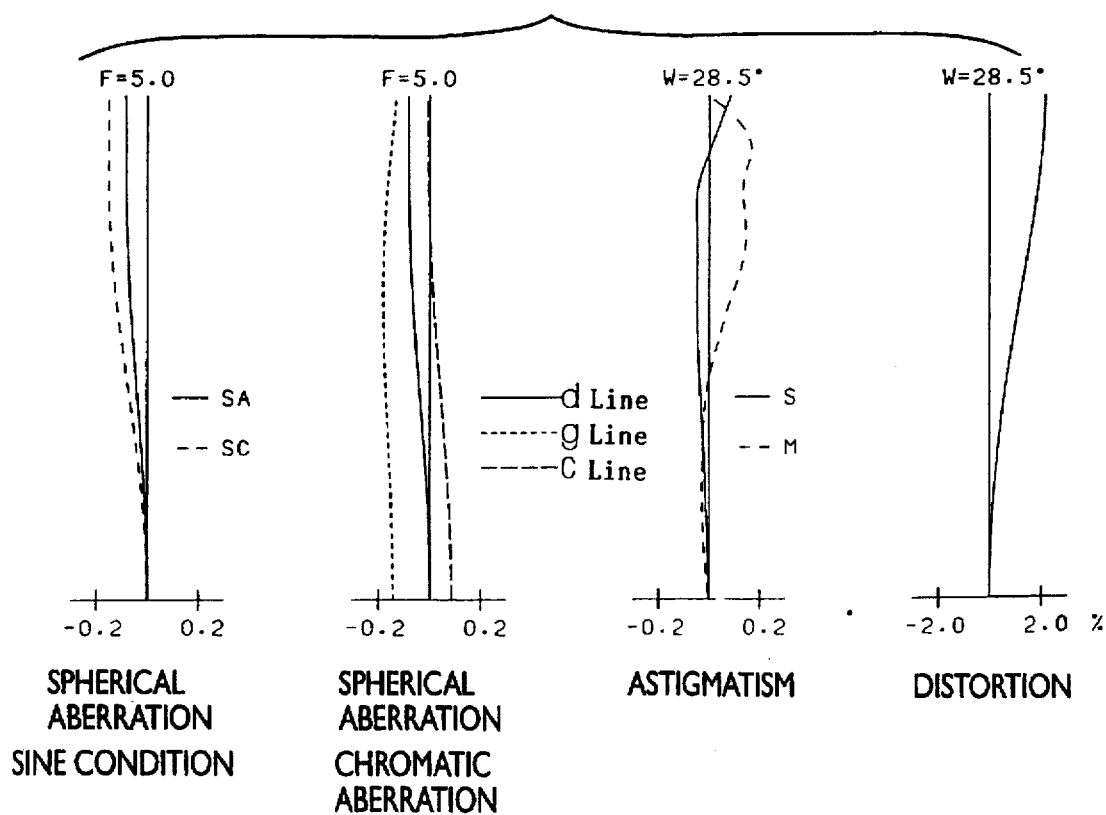
FIG. 14 shows diagrams of various aberrations of the zoom lens system shown in FIG. 13, at a wide angle extremity.
Figure 15:
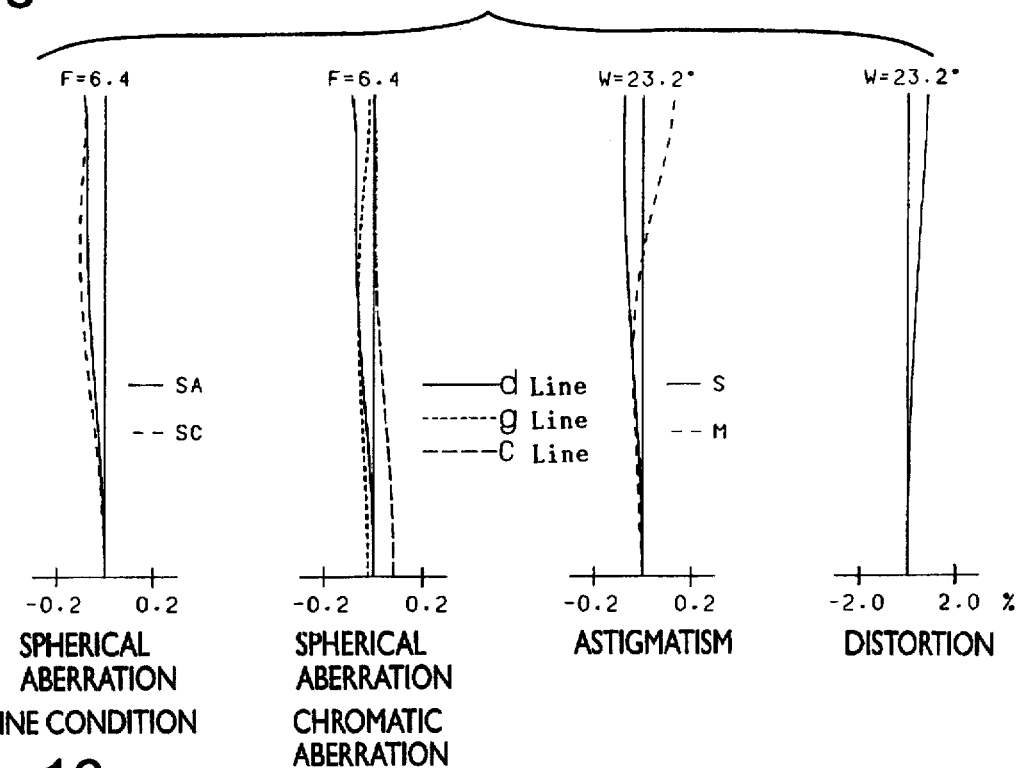
FIG. 15 shows diagrams of various aberrations of the zoom lens system shown in FIG. 13, at an intermediate focal length.
Figure 16:
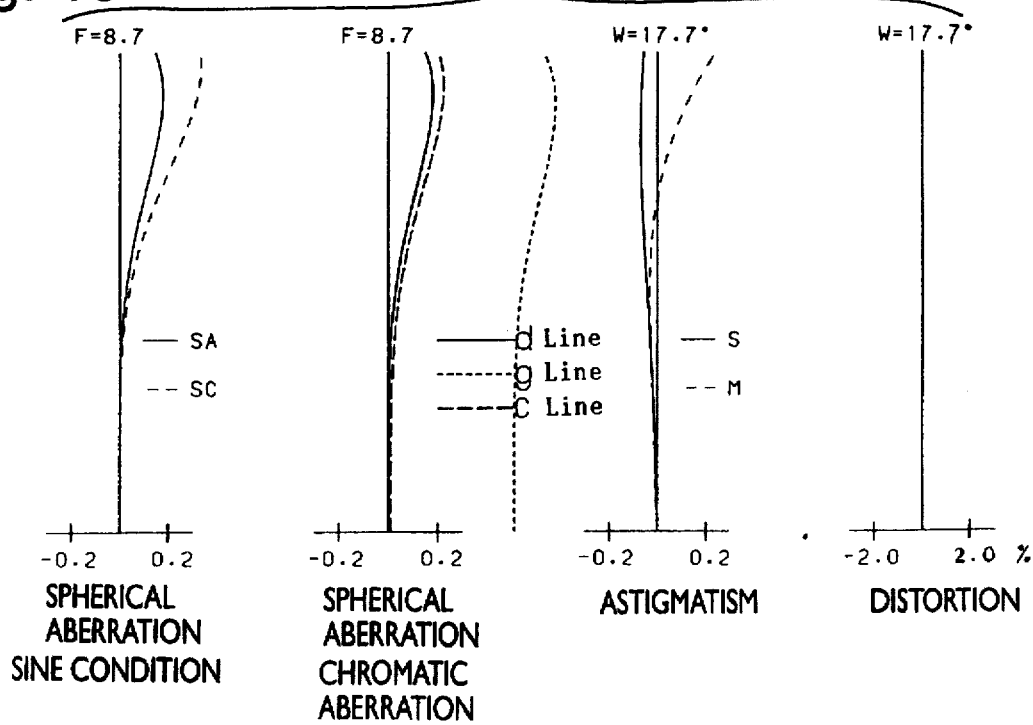
FIG. 16 shows diagrams of various aberrations of the zoom lens system shown in FIG. 13, at a telephoto extremity.

$\Delta P_{L2}+\Delta P_{L4}=0.38$ $(\Delta P_{L2}=-0.34, \Delta P_{L4}=0.72)$ $f_{L2}=-159.8$, $m_{L3-L5}=-1.620$, $m_{L2-L5}=-1.158$ $\therefore \Delta P_{L2}=-0.34$ $f_{L4}=49.2$, $m_{L5}=3.703$, $m_{L4-L5}=2.494$ $\therefore \Delta P_{L4}=0.72$ $f_W/f_{1G}=1.43, f_{1G}/f_{L1-L2}=-0.65$, $f_{L1-L2}/f_{L1}=0.71$ Embodiment 4:

FIG. 13 shows the lens arrangement of a zoom lens system in the fourth embodiment. Numerical data of the zoom lens system of the fourth embodiment is shown in Table 4 below. Aberrations at the wide angle extremity, an intermediate focal length, and the telephoto extremity are shown in FIGS. 14, 15 and 16, respectively.

TABLE 4

$F_{NO} = 1:5.0–6.4–8.7$
$f = 39.0–50.0–68.0$
$W = 28.5–23.2–17.7$
$f_B = 14.05–25.71–44.80$
$d_6 = 13.53–9.28–5.29$

The stop (diaphragm) is located 0.9 mm behind the second surface of the third lens.

| Surface No. | R | d | $N_d$ | $v_d$ |
|---|---|---|---|---|
| 1 | −27.618 | 1.40 | 1.69895 | 30.1 |
| 2 | −64.225 | 0.50 | — | — |
| 3* | 32.434 | 1.60 | 1.58547 | 29.9 |
| 4 | 22.037 | 2.79 | — | — |
| 5 | 33.677 | 6.00 | 1.48749 | 70.2 |
| 6 | −12.198 | $d_6$ | — | — |
| 7* | −98.359 | 2.76 | 1.58547 | 29.9 |
| 8 | −21.043 | 3.45 | — | — |
| 9 | −11.050 | 1.40 | 1.72342 | 38.0 |
| 10 | −163.647 | — | — | — |

*marked surface is aspherical.
NO. 3: $K = 0.0, A4 = −0.13492 \times 10^{-3}, A6 = −0.98748 \times 10^{-6}, A8 = 0.0, A10 = 0.0$
NO. 7: $K = 0.0, A4 = 0.45866 \times 10^{-4}, A6 = 0.11091 \times 10^{-6}, A8 = 0.24238 \times 10^{-8}, A10 = 0.0$ Data corresponding to relationships 1 to 10, for the fourth embodiment, is given below:

SF1=−2.51

SF2=5.24

$\Delta X_{L2-J}$=−0.0635 (when h=4.5)

$\Delta X_{L4-J}$=0.1666 (when h=7.3)

$P_{L2}+\Delta P_{L4}$=0.29

($\Delta P_{L2}$=−0.43, $\Delta P_{L4}$=0.72)

$f_{L2}$=−124.5, $m_{L3-L5}$=−1.553, $m_{L2-L5}$=−0.966

∴$\Delta P_{L2}$=−0.43

$f_{L4}$=45.1, $m_{L5}$=3.810, $m_{L4-L5}$=2.550

∴$\Delta P_{L4}$=0.72

$f_W/f_{1G}$=1.46, $f_{1G}/f_{L1-L2}$=−0.61, $f_{L1-L2}/f_{L1}$=0.62

Figure 17:
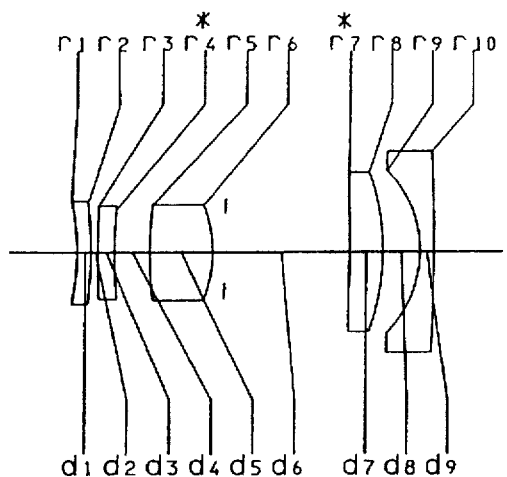
FIG. 17 is a schematic view showing a lens arrangement of a zoom lens system, according to a fifth embodiment of the present invention.
Figure 18:
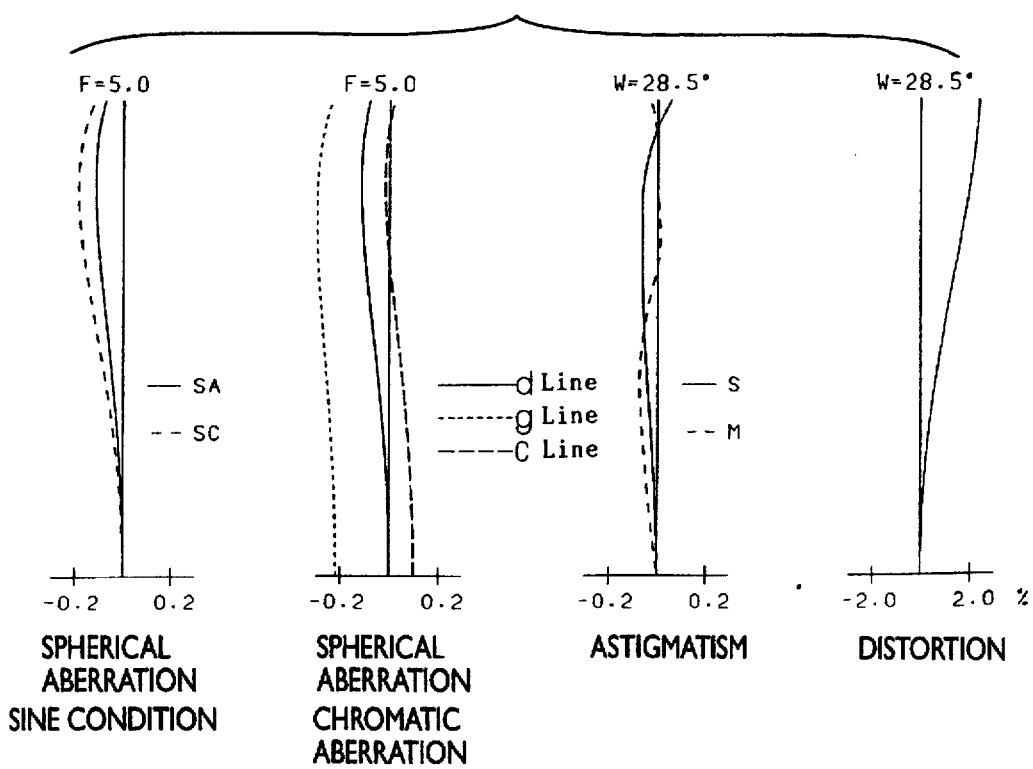
FIG. 18 shows diagrams of various aberrations of the zoom lens system shown in FIG. 17, at a wide angle extremity.
Figure 19:
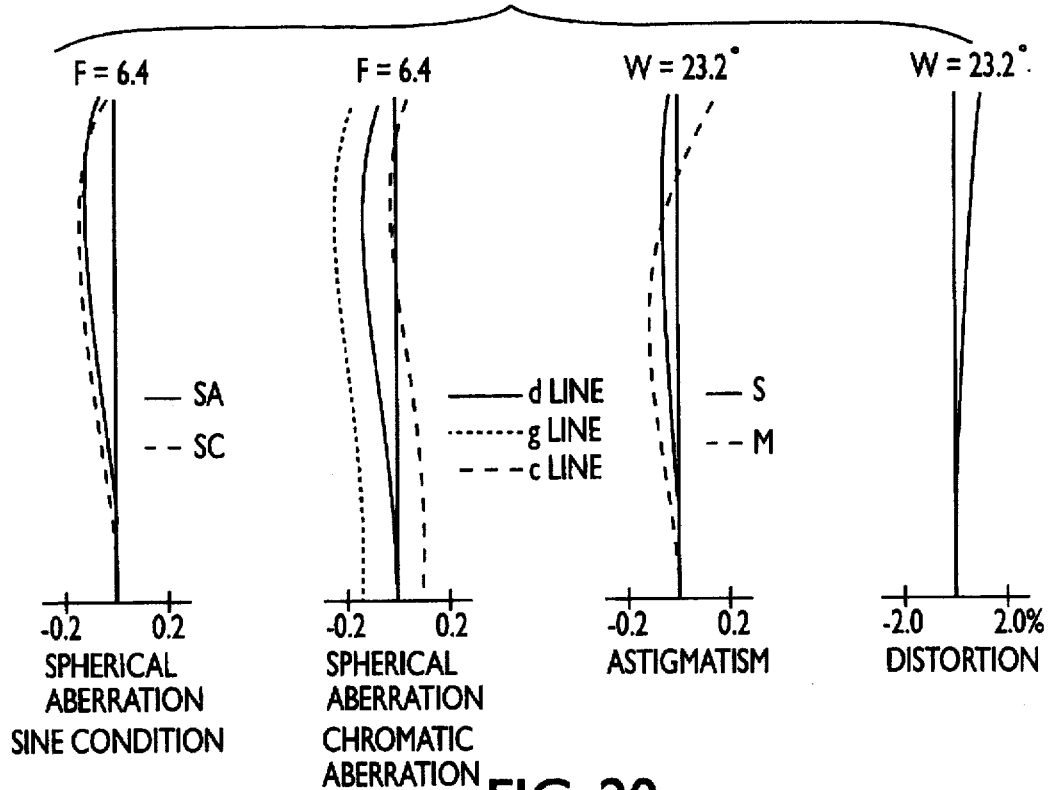
FIG. 19 shows diagrams of various aberrations of the zoom lens system shown in FIG. 17, at an intermediate focal length.
Figure 20:
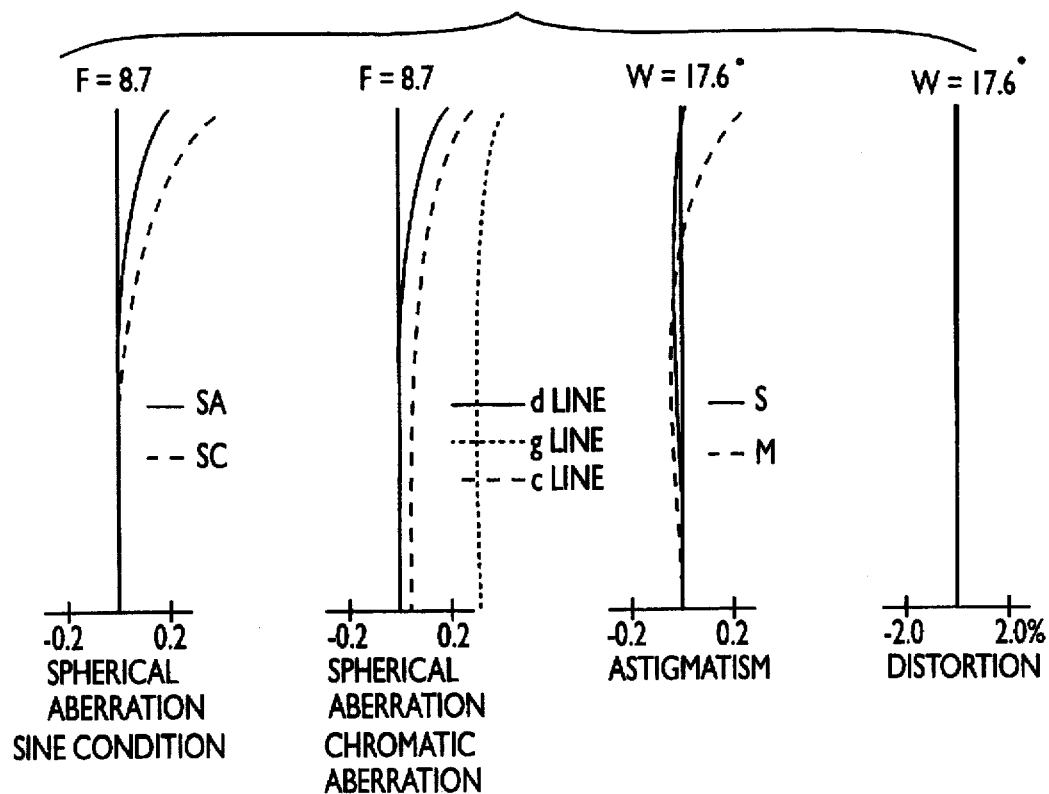
FIG. 20 shows diagrams of various aberrations of the zoom lens system shown in FIG. 17, at a telephoto extremity.

Embodiment 5:

FIG. 17 shows a lens arrangement of a zoom lens system according to the fifth embodiment. Numerical data of the lens system of the fifth embodiment is shown in Table 5 below. Aberrations at the wide angle extremity, an intermediate focal length, and the telephoto extremity are shown in FIGS. 18, 19 and 20, respectively.

TABLE 5

$F_{NO} = 1:5.0–6.4–8.7$
$f = 39.0–50.0–68.0$
$W = 28.5–23.2–17.6$
$f_B = 13.86–25.17–43.69$
$d_6 = 13.14–9.12–5.35$

The stop (diaphragm) is located 0.9 mm behind the second surface of the third lens.

| Surface No. | R | d | $N_d$ | $v_d$ |
|---|---|---|---|---|
| 1 | −23.601 | 1.40 | 1.75520 | 27.5 |
| 2 | −40.492 | 0.50 | — | — |
| 3 | 97.196 | 1.60 | 1.58547 | 29.9 |
| 4* | 51.567 | 3.32 | — | — |
| 5 | 41.024 | 6.00 | 1.48749 | 70.2 |
| 6 | −12.606 | $d_6$ | — | — |
| 7* | −102.979 | 3.23 | 1.58547 | 29.9 |
| 8 | −22.558 | 3.63 | — | — |
| 9 | −11.050 | 1.40 | 1.72342 | 38.0 |
| 10 | −183.134 | — | — | — |

*marked surface is aspherical.
NO. 4: $K = 0.0, A4 = 0.13073 \times 10^{-3}, A6 = 0.79584 \times 10^{-6}, A8 = 0.58632 \times 10^{-8}, A10 = 0.0$
NO. 7: $K = 0.0, A4 = 0.46900 \times 10^{-4}, A6 = 0.12022 \times 10^{-6}, A8 = 0.24993 \times 10^{-8}, A10 = 0.0$ Data corresponding to formulae 1 to 10, for the fifth embodiment, is given below:

SF1=−3.79

SF2=3.26

$\Delta X_{L2-J}$ (no corresponding aspherical surface exists)

$\Delta X_{L4-J}$=0.1715 (when h=7.3)

$\Delta P_{L2}+\Delta P_{L4}$=0.37

($\Delta P_{L2}$=−0.27, $\Delta P_{L4}$=0.64)

$f_{L2}$=−190.1, $m_{L3-L5}$=−1.255, $m_{L2-L5}$=−0.875

∴$\Delta P_{L2}$=−0.27

$f_{L4}$=48.60, $m_{L5}$=3.730, $m_{L4-L5}$=2.580

∴$\Delta P_{L4}$0.64

$f_W/f_{1G}$=1.48, $f_{1G}/f_{L1-L2}$=−0.49, $f_{L1-L2}/f_{L1}$=0.70

Figure 21:
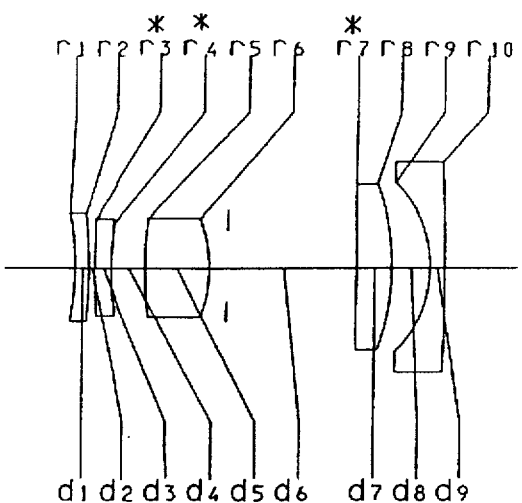
FIG. 21 is a schematic view showing a lens arrangement of a zoom lens system, according to a sixth embodiment of the present invention.
Figure 22:
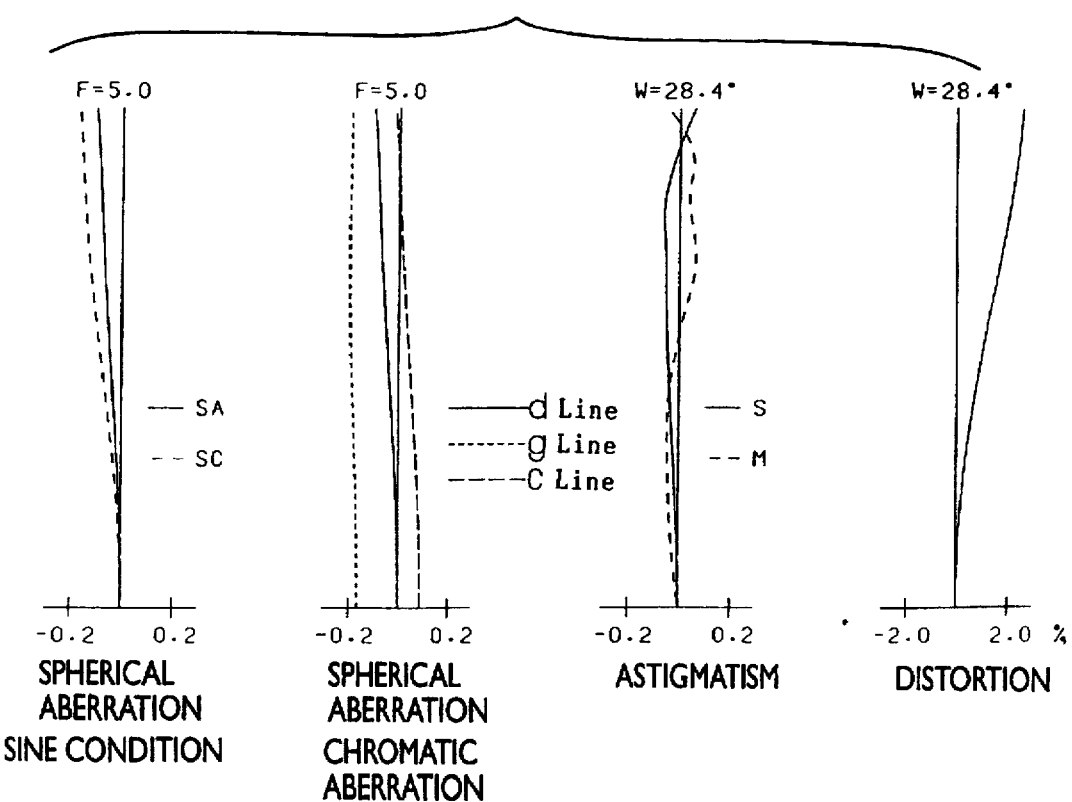
FIG. 22 shows diagrams of various aberrations of the zoom lens system shown in FIG. 21, at a wide angle extremity.
Figure 23:
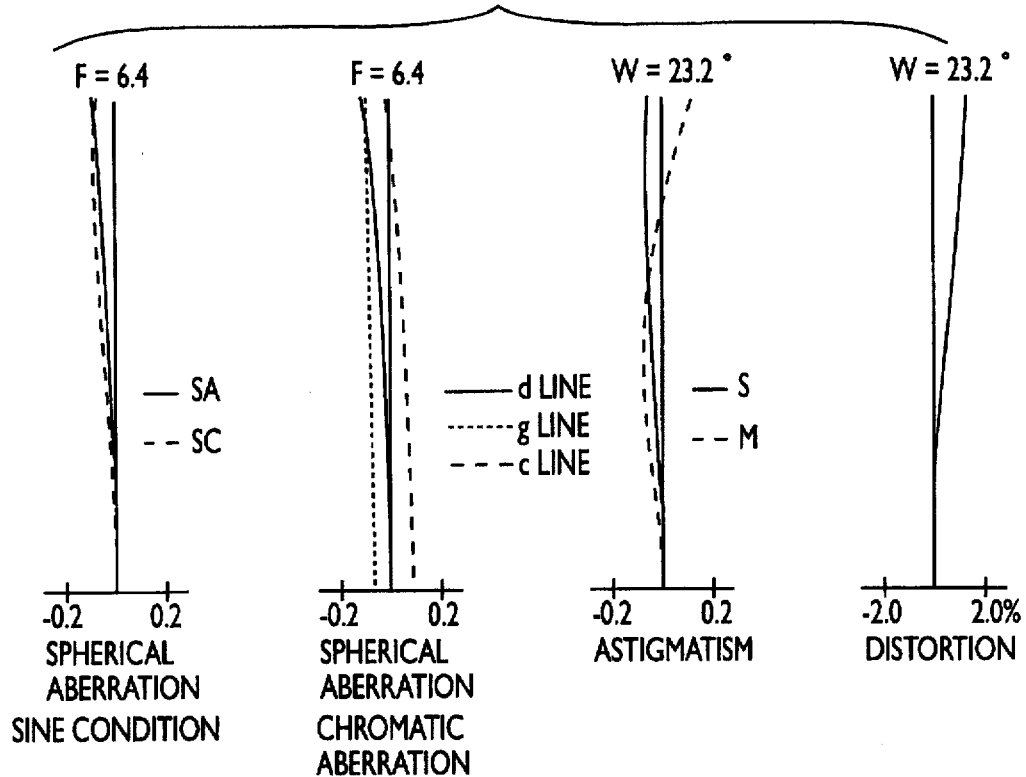
FIG. 23 shows diagrams of various aberrations of the zoom lens system shown in FIG. 21, at an intermediate focal length.
Figure 24:
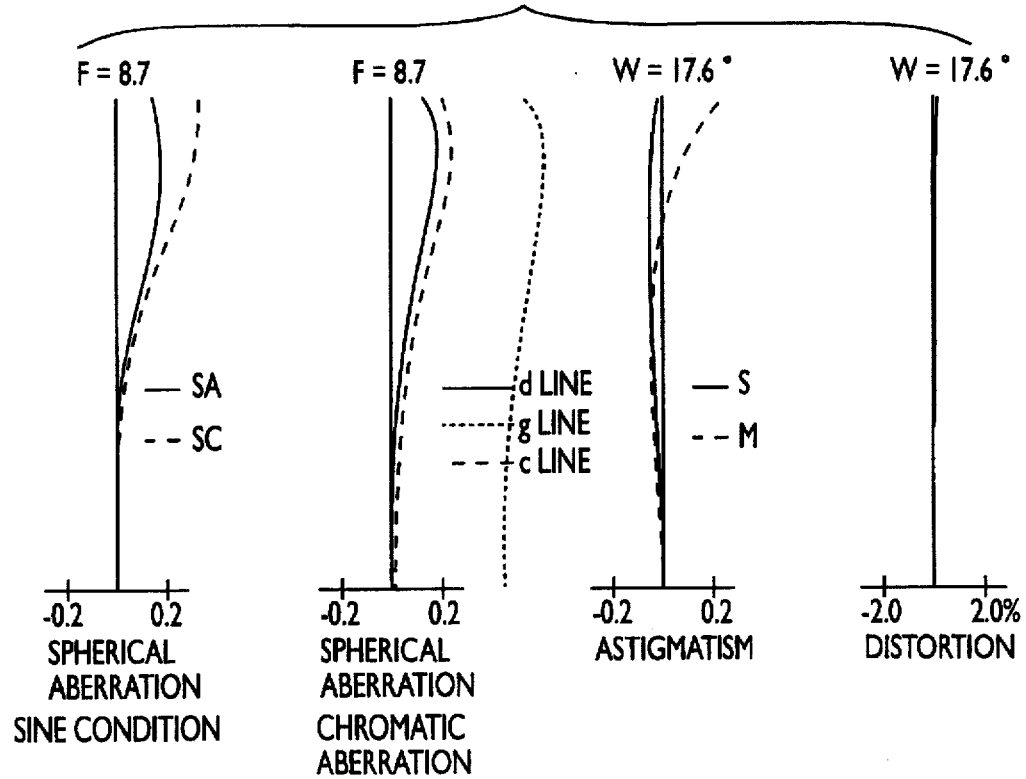
FIG. 24 shows diagrams of various aberrations of the zoom lens system shown in FIG. 21, at a telephoto extremity; and, FIG. 25 is an explanatory view of an aspherical surface used to define the amount of aspherical deviation.

Embodiment 6:

FIG. 21 shows a lens arrangement of a zoom lens system according to the sixth embodiment of the present invention. Numerical data of the lens system of the sixth embodiment is shown in Table 6 below. Aberrations at the wide angle extremity, an intermediate focal length, and the telephoto extremity are shown in FIGS. 22, 23 and 24, respectively.

TABLE 6

$F_{NO.} = 1:5.0-6.4-8.7$
$f = 39.0-50.0-68.0$
$W = 28.4-23.2-17.6$
$f_B = 13.74-25.10-43.68$
$d_6 = 13.31-9.20-5.35$

The stop (diaphragm) is located 0.9 mm behind the second surface of the third lens.

| Surface No. | R | d | $N_d$ | $\nu_d$ |
|---|---|---|---|---|
| 1 | −25.650 | 1.40 | 1.75084 | 27.7 |
| 2 | −45.704 | 0.50 | — | — |
| 3* | 59.493 | 1.60 | 1.58547 | 29.9 |
| 4* | 34.428 | 3.04 | — | — |
| 5 | 38.376 | 6.00 | 1.48749 | 70.2 |
| 6 | −12.468 | $d_6$ | — | — |
| 7* | −115.816 | 3.23 | 1.58547 | 29.9 |
| 8 | −22.549 | 3.55 | — | — |
| 9 | −11.050 | 1.40 | 1.72342 | 38.0 |
| 10 | −166.344 | — | — | — |

*marked surface is aspherical.

NO. 3: $K = 0.0, A4 = -0.74507 \times 10^{-4}, A6 = -0.27887 \times 10^{-6}, A8 = 0.0, A10 = 0.0$ NO. 4: $K = 0.0, A4 = 0.59537 \times 10^{-4}, A6 = 0.61616 \times 10^{-6}, A8 = 0.0, A10 = 0.0$ NO. 7: $K = 0.0, A4 = 0.47415 \times 10^{-4}, A6 = 0.12268 \times 10^{-6}, A8 = 0.24582 \times 10^{-8}, A10 = 0.0$ Data corresponding to relationships 1 to 10, for the sixth embodiment, is given below:

$SF1 = -3.56$ $SF2 = 3.75$ $\Delta X_{L2-F} = -0.0329$ (when h=4.5)

$\Delta X_{L4-F} = 0.1730$ (when h=7.3)

$\Delta P_{L2} + \Delta P_{L4} = 0.29$ $(\Delta P_{L2} = -0.36, \Delta P_{L4} = 0.66)$ $f_{L2} = -143.0,$ $m_{L3-L5} = -1.352,$ $m_{L2-L5} = -0.847$ $\therefore \Delta P_{L2} = -0.36$ $F_{L4} = 47.20,$ $m_{L5} = 3.740,$ $m_{L4-L5} = 2.560$ $\therefore \Delta P_{L4} = 0.66$ $f_W/f_{1G} = 1.47, f_{1G}/f_{L1-L2} = -0.53,$ $f_{L1-L2}/f_{L1} = 0.63$ Table 7 below shows numerical values (results) of the relationships (1) through (10) in the above-mentioned six embodiments of the present invention.

TABLE 7

| | Embodiment | | | | | |
|---|---|---|---|---|---|---|
| | 1 | 2 | 3 | 4 | 5 | 6 |
| Relationship (1) | 0.00 | −0.52 | −1.09 | −2.51 | −3.79 | −3.56 |
| Relationship (2) | 5.86 | 5.04 | 5.80 | 5.24 | 3.26 | 3.75 |
| Relationship (3) | −0.1122 | −0.0702 | −0.0685 | −0.0635 | — | −0.0329 |
| Relationship (4) | 0.1984 | 0.1438 | 0.1647 | 0.1666 | 0.1715 | 0.1730 |
| Relationship (5) | 0.27 | 0.29 | 0.38 | 0.29 | 0.37 | 0.29 |
| Relationship (6) | −0.36 | −0.43 | −0.34 | −0.43 | −0.27 | −0.36 |
| Relationship (7) | 0.63 | 0.72 | 0.72 | 0.72 | 0.64 | 0.66 |
| Relationship (8) | 1.43 | 1.42 | 1.43 | 1.46 | 1.48 | 1.47 |
| Relationship (9) | −0.66 | −0.66 | −0.65 | −0.61 | −0.49 | −0.53 |
| Relationship (10) | 0.70 | 0.64 | 0.72 | 0.62 | 0.70 | 0.63 |

As can be seen from Table 7, the numerical values in each embodiment satisfy the relationships (1) through (10). It has been found that the aberrations can be well corrected in the zoom lens system having a small number of lenses, according to the present invention, in which plastic lenses and aspherical surfaces are effectively employed.

As can be understood from the above discussion, according to the present invention, since plastic lenses and aspherical surfaces are effectively utilized in a zoom lens system and the number of lenses to form the zoom lens system is reduced, not only can the production cost be reduced, but also a high optical performance can be obtained while limiting the influence of changes temperature and humidity on the plastic lenses.

We claim:

1. A zoom lens system having two lens groups including five lenses, comprising:

a positive first lens group and a negative second lens group, arranged in this order from an object side so that a distance between said first lens group and said second lens group is changed during a zooming operation;

said first lens group comprising a first negative sub-lens group and a first positive sub-lens group;

said first negative sub-lens group comprising a negative first lens and a negative second lens, a distance between said negative first lens and said negative second lens remaining constant during a zooming operation, said first positive sub-lens group comprising a positive third lens; and, said negative second lens group comprising a positive fourth lens and a negative fifth lens, in this order from the object side;

wherein said zoom lens system satisfies the relationships:

$SF1 = (r_{1-1} + r_{1-2})/(r_{1-1} - r_{1-2}) \leq 0$ $SF2 = (r_{2-1} + r_{2-2})/(r_{2-1} - r_{2-2}) > 0$ wherein SF1 represents a shaping factor of said negative first lens; SF2 represents a shaping factor of said negative second lens; and $r_{i-j}$ represents a radius of curvature of a j-th surface of an i-th lens.

2. The zoom lens system according to claim 1, wherein said negative second lens comprises a negative meniscus lens having a convexity in a paraxial shape facing the object side, and a diverging aspherical surface that satisfies the following relationship:

$$\Delta X_{L2-I} < 0$$

wherein $\Delta X_{L2-I}$ represents an amount of aspherical deviation of the surface of a second lens from the object side at the maximum effective diameter thereof.

3. The zoom lens system according to claim 1, wherein said positive fourth lens comprises a positive meniscus lens having a concavity in the paraxial shape facing the object side, and a converging aspherical surface that satisfies the following relationship:

$$0 < \Delta X_{L4-I}$$

wherein $\Delta X_{L4-I}$ represents an amount of aspherical deviation of the surface of a fourth lens from the object side at the maximum effective diameter thereof.

4. The zoom lens system according to claim 1, wherein said zoom lens system satisfies the relationship:

$$0.0 < \Delta P_{L2} + \Delta P_{L4} < 0.6$$

wherein $$\Delta P_{L2} = f_{L2} \cdot (m_{L3-L5} - m_{L2-L5})^2 / 100$$

$\Delta P_{L2}$ represents a variation of focus when the focal length of the second lens changes by +1% at the telephoto extremity;

$f_{L2}$ represents a focal length of the second lens;

$m_{L3-L5}$ represents a lateral magnification of the third through fifth lenses at the telephoto extremity;

$m_{L2-L5}$ represents a lateral magnification of the second through fifth lenses at the telephoto extremity; and wherein $$\Delta P_{L4} = f_{L4} \cdot (m_{L5} - m_{L4-L5})^2 / 100$$

$\Delta P_{L4}$ represents a variation of focus when the focal length of the fourth lens changes by +1% at the telephoto extremity;

$f_{L4}$ represents a focal length of the fourth lens;

$m_{L5}$ represents a lateral magnification of the fifth lens at the telephoto extremity; and $m_{L4-L5}$ represents a lateral magnification of the fourth and fifth lenses at the telephoto extremity.

5. The zoom lens system according to claim 4, wherein said zoom lens system satisfies the relationships:

$$-0.7 < \Delta P_{L2} < -0.1$$

$$0.3 < \Delta P_{L4} < 1.0.$$

6. The zoom lens system according to claim 1 wherein said negative first lens comprises a glass lens, said negative second lens comprising a plastic lens, said positive third lens comprising a glass lens, said positive fourth lens comprising a plastic lens, and said fifth negative lens comprising a glass lens.

7. The zoom lens system according to claim 1, wherein an object-side surface of said negative first lens is a concave surface.

8. A zoom lens system comprising:

a positive first lens group and a negative second lens group, arranged in this order from an object side so that the distance between said first lens group and said second lens group is changed to alter a focal length;

said first lens group comprising a first negative sub-lens group and a first positive sub-lens group; and, said first negative sub-lens group comprising a negative first lens and a negative second lens, said first positive sub-lens group comprising a positive third lens;

wherein said zoom lens system satisfies the relationships:

$$SF1 = (r_{1-1} + r_{1-2})/(r_{1-1} - r_{1-2}) \leq 0$$

$$SF2 = (r_{2-1} + r_{2-2})/(r_{2-1} - r_{2-2}) > 0$$

$$1.3 < f_W/f_{1G} < 1.7$$

$$-0.9 < f_{1G}/f_{L1-L2} < -0.4$$

$$0.3 < f_{L1-L2}/f_{L1} < 1.0$$

wherein fw represents a focal length of the overall system at the wide angle extremity;

$f_{1G}$ represents a focal length of said first lens group;

$f_{L1-L2}$ represents a focal length of said first negative sub-lens group;

$f_{L1}$ represents a focal length of said first negative lens of said first negative sub-lens group;

SF1 represents a shaping factor of said negative first lens;

SF2 represents a shaping factor of said negative second lens;

$r_{i-j}$ represents a radius of curvature of a j-th surface of an i-th lens.

9. The zoom lens system according to claim 8, wherein said negative second lens comprises a negative meniscus plastic lens having a convexity in a paraxial shape facing the object side, and a diverging aspherical surface that satisfies the following relationship:

$$\Delta X_{L2-I} < 0.$$

10. The zoom lens system according to claim 8, wherein the second lens group is made of a positive fourth lens and a negative fifth lens, said positive fourth lens being made of a positive meniscus plastic lens having a concavity in a paraxial shape facing the object side, and a converging aspherical surface that satisfies the following relationship:

$$0 < \Delta X_{L4-I}.$$

11. A zoom lens system consisting of two lens groups, said zoom lens system comprising:

a positive first lens group and a negative second lens group arranged in this order from an object side so that a distance between said positive first lens group and said negative second lens group is changed during a zooming operation;

said positive first lens group comprising a negative first lens having a concave object-side surface, a negative second lens, and a positive third lens in this order from the object side; and said negative second lens group comprising a positive fourth lens and a negative fifth lens, in this order from the object side;

wherein said zoom lens system satisfies the relationships:

$$SF1=(r_{1-1}+r_{1-2})/(r_{1-1}-r_{1-2})\leq 0$$

$$SF2=(r_{2-1}+r_{2-2})/(r_{2-1}-r_{2-2})>0$$

wherein SF1 represents a shaping factor of said negative first lens, SF2 represents a shaping factor of said negative second lens, and $r_{i-j}$ represents a radius of curvature of a j-th surface of an i-th lens.

12. The zoom lens system according to claim 11, wherein said first negative lens comprises a concave image-side surface.

13. The zoom lens system according to claim 11, wherein said first negative lens comprises a convex image-side surface.

* * * * *